US008788975B1

(12) United States Patent
Griddaluru

(10) Patent No.: US 8,788,975 B1
(45) Date of Patent: Jul. 22, 2014

(54) SYSTEM AND METHOD OF DISPLAYING GEOGRAPHIC ENTITIES

(75) Inventor: Vijayakrishna Griddaluru, Mountain View, CA (US)

(73) Assignee: Google Inc., Mountain View, CA (US)

( * ) Notice: Subject to any disclaimer, the term of this patent is extended or adjusted under 35 U.S.C. 154(b) by 732 days.

(21) Appl. No.: 12/543,756

(22) Filed: Aug. 19, 2009

(51) Int. Cl.
*G09G 5/00* (2006.01)

(52) U.S. Cl.
USPC ........... 715/853; 715/851; 715/860; 715/861; 715/866

(58) Field of Classification Search
CPC ....................................................... G01C 21/32
USPC ............................ 715/853, 851, 860, 861, 866
See application file for complete search history.

(56) References Cited

U.S. PATENT DOCUMENTS

| 8,140,421 | B1 * | 3/2012 | Humphries et al. | 705/37 |
| 2004/0001114 | A1 * | 1/2004 | Fuchs et al. | 345/855 |
| 2004/0117358 | A1 * | 6/2004 | von Kaenel et al. | 707/3 |
| 2005/0288957 | A1 * | 12/2005 | Eraker et al. | 705/1 |
| 2009/0300528 | A1 * | 12/2009 | Stambaugh | 715/764 |

OTHER PUBLICATIONS

"Google Chart API" [online]. [Retrieved Apr. 6, 2009]. Retrieved from the Internet: <http://code.google.com/apis/chart/types.html>, 13 pages.
"Google Maps API Reference" [online]. [Retrieved Aug. 10, 2009]. Retrieved from the internet: <http://code.google.com/>, 131 pages.

* cited by examiner

*Primary Examiner* — Weilun Lo
*Assistant Examiner* — Peiyong Weng
(74) *Attorney, Agent, or Firm* — Lerner, David, Littenberg, Krumholz & Mentlik, LLP

(57) ABSTRACT

A system and method is provided that identifies one geographic entity based on another geographic entity. In one aspect, a user may select one of plurality of relationships that associates one geographic region with one or more other geographic regions. When the user selects one of the geographic regions, the related geographic region(s) are highlighted based on the selected relationship.

25 Claims, 20 Drawing Sheets

SYSTEM AND METHOD OF DISPLAYING GEOGRAPHIC ENTITIES

BACKGROUND OF THE INVENTION

Many online maps provide features that leverage the power of the computer and the internet for display, annotation and collaboration. These same maps often also replicate the basic tasks associated with exploring a physical globe or map. For example, the user may zoom in/out and pan (e.g., scroll) the map with the use of a keyboard or mouse.

Some computerized services, such as Google Maps and Google Earth, provide additional interactivity, such as plotting a route and clicking waypoints along the route. Google Maps also provides an API for user-created layers, e.g., allowing users to program new functionality with computer code and share the new functionality with others. For example, one such layer may permit users to drag a mouse to calculate distances.

BRIEF SUMMARY OF THE INVENTION

In one aspect, a method is provided that includes displaying, on an electronic display, a plurality of geographic entities on a map, each geographic entity being displayed with a visual characteristic. The method further includes receiving data identifying a plurality of relationships (each relationship associates at least one geographic entity with at least one other geographic entity), receiving a user's identification of a first geographic entity, and determining, with a processor and based on the identification of the first geographic entity and a relationship associated with the first entity, a second geographic entity. The visual characteristic associated with the second geographic entity is then modified and the second geographic entity is displayed with the modified visual characteristic.

Another aspect relates to a system that includes a first computer at a first node of a network and a client device at a second node of the network different from the first node, where the client device includes a user input device, an electronic display, a processor and instructions operable by the processor. The first computer has access to instructions operable by the first computer, a set of geographic regions, image information associated with each geographic region, and a plurality of relationships wherein each relationship links one region to another region based on the same linking criteria. The instructions of the first computer include: receiving an identification of a relationship from the second computer; transmitting image information associated with a plurality of a geographic regions to the second computer; receiving an identification of a first geographic region from the second computer; determining a second geographic region based on the first geographic region and the identified relationship; and transmitting different image information associated with the second geographic region to the client device over the network. The instructions of the client device include: identifying the first geographic region with the user input device; displaying the second geographic region prior identifying the first geographic region; and displaying the second geographic region in accordance with the different image information after identifying the first geographic region.

Yet another aspect also provides a system. In this aspect, the system includes a first computer at a first node of a network, a second computer at a second node of the network and a third computer at a third node of the network. Each computer is associated with a display, a processor executing instructions, and has access to entity data, relationship and action data. In this aspect of the system, the entity data identifies a plurality of geographic entities and an image associated with the geographic entity, the relationship data identifies relationships between the geographic entities, and the action data identifies how an entity should be displayed when the entity is identified based on its relationship with another entity that was selected by user. The instructions of each computer include modifying the relationship data and providing the relationship data to one of the other computers over the network.

In still a further aspect, a system is provided that includes a processor, instructions operable by the processor, an electronic memory storing the instructions, and an electronic memory storing data accessed by the processor. The instructions comprise: displaying, on an electronic display, a plurality of geographic entities on a map, each geographic entity being displayed with a visual characteristic; accessing data identifying a plurality of relationships, where each relationship associates at least one geographic entity with at least one other geographic entity; receiving a user's identification of a first geographic entity via a user input; determining, with a processor and based on the identification of the first geographic entity and a relationship associated with the first entity, a second geographic entity; modifying the visual characteristic associated with the second geographic entity and; displaying the second geographic entity with the modified visual characteristic.

A further aspect relates to a computer-usable medium including a program executable by a processor. The medium comprises: computer code that displays, on an electronic display, a plurality of geographic entities on a map, each geographic entity being displayed with a visual characteristic; computer code that accesses data identifying a plurality of relationships, where each relationship associates at least one geographic entity with at least one other geographic entity; computer code that receives a user's identification of a first geographic entity via a user input; computer code that determines, with a processor and based on the identification of the first geographic entity and a relationship associated with the first entity, a second geographic entity; computer code that modifies the visual characteristic associated with the second geographic entity and; computer code that displays the second geographic entity with the modified visual characteristic.

DETAILED DESCRIPTION

A system and method is provided that identifies one geographic entity based on another geographic entity. By way of example, a device may display a plurality of geographic regions on a map and allow the user to select one of a plurality of relationships that associates one geographic region with one or more other geographic regions. For instance, one relationship may define whether regions border one another, and another relationship may define the next largest or smallest region based on some size criteria. When the user selects one of the geographic regions, related geographic regions may be highlighted in accordance with the selected relationship.

Figure 1:
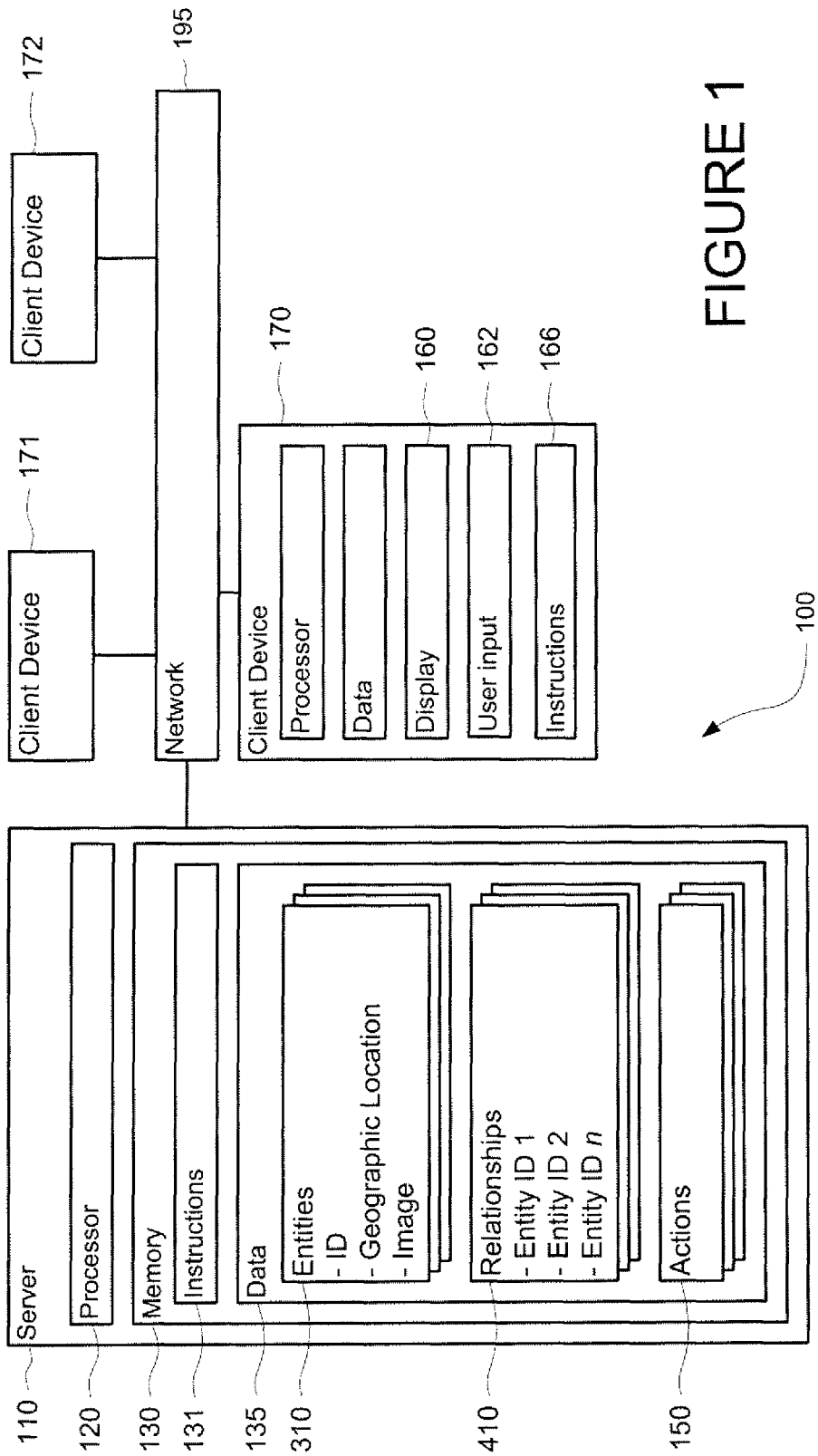
FIG. 1 is a functional diagram of a system in accordance with an aspect of the system.
Figure 2:
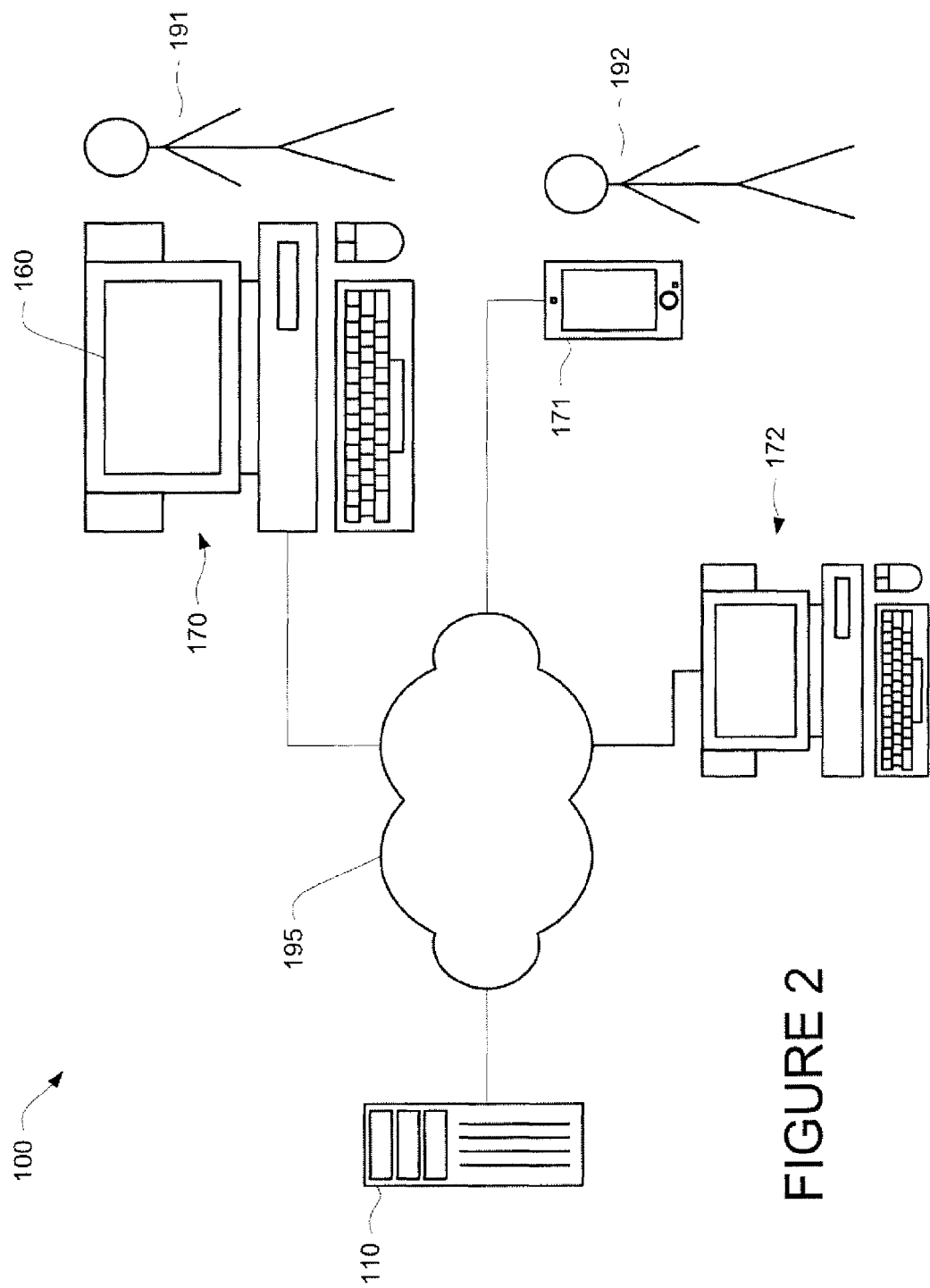
FIG. 2 is a pictorial diagram of a system in accordance with an aspect of the system.

As shown in FIGS. 1-2, a system 100 in accordance with one aspect of the invention includes a computer 110 containing a processor 120, memory 130 and other components typically present in general purpose computers.

Memory 130 stores information accessible by processor 120, including instructions 131 that may be executed by the processor 120 and data 135. The memory may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. The system and method may include different combinations of the foregoing, whereby different portions of the instructions and data are stored on different types of media.

The instructions 131 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

Data 135 may be retrieved, stored or modified by processor 120 in accordance with the instructions 131. For instance, although the system and method is not limited by any particular data structure, the data may be stored in computer registers, in a relational database as a table having a plurality of different fields and records, XML documents or flat files. The data may also be formatted in any computer-readable format such as, but not limited to, binary values or Unicode. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any well-known processor, such as processors from Intel Corporation or AMD. Alternatively, the processor may be a dedicated controller such as an ASIC. Although FIG. 1 functionally illustrates the processor and memory as being within the same block, it will be understood by those of ordinary skill in the art that the processor and memory may actually comprise multiple processors and memories that may or may not be stored within the same physical housing. Accordingly, references to a processor or computer will be understood to include references to a collection of processors or computers or memories that may or may not operate in parallel.

The computer 110 may be at one node of a network 195 and capable of directly and indirectly communicating with other nodes of the network. For example, computer 110 may comprise a web server that is capable of communicating with client devices 170-72 via network 195 such that server 110 uses network 195 to transmit and display information to user 190 on display 160 of client device 170. Server 110 may also comprise a plurality of computers that exchange information with different nodes of a network for the purpose of receiving, processing and transmitting data to the client devices; in this instance, the client devices will typically still be at different nodes of the network than any of the computers comprising server 110.

Network 195, and intervening nodes between server 110 and client devices, may comprise various configurations and use various protocols including the Internet, World Wide Web, intranets, virtual private networks, local Ethernet networks, private networks using communication protocols proprietary to one or more companies, cellular and wireless networks (e.g., WiFi), instant messaging, HTTP and SMTP, and various combinations of the foregoing. Although only a few computers are depicted in FIGS. 1-2, it should be appreciated that a typical system can include a large number of connected computers.

Each client device may be configured similarly to the server 110, with a processor, memory and instructions. Each client device 170-72 may be a personal computer intended for use by a person 190-191, and have all of the components normally used in connection with a personal computer such as a central processing unit (CPU), memory (e.g., RAM and internal hard drives) storing data and instructions, an electronic display 160 (e.g., a monitor having a screen, a small LCD touch-screen, a projector, a television, or any other electrical device that is operable to display information), user input 162 (e.g., a mouse, keyboard, touch-screen or microphone), camera 163, speakers, a network interface device, and all of the components used for connecting these elements to one another.

Although the client devices 170-72 may comprise a full-sized personal computer, the system and method may also be used in connection with mobile devices capable of wirelessly exchanging data with a server over a network such as the Internet. By way of example only, client device 171 may be a wireless-enabled PDA or a cellular phone capable of obtaining information via the Internet. The user may input information using a small keyboard (in the case of a Blackberry phone), a keypad (in the case of a typical cell phone) or a touch screen (in the case of a PDA). Indeed, computers in accordance with the systems and methods described herein may comprise any device capable of processing instructions and transmitting data to and from humans and other computers including general purpose computers, network computers lacking local storage capability, and set-top boxes for televisions.

Although certain advantages are obtained when information is transmitted or received as noted above, other aspects of the system and method are not limited to any particular manner of transmission of information. For example, in some aspects, information may be sent via a medium such as an optical disk or portable drive. In other aspects, the information may be transmitted in a non-electronic format and manually entered into the system. Yet further, although some functions are indicated as taking place on a server and others on a client, various aspects of the system and method may be implemented by a single computer having a single processor.

Figure 3:
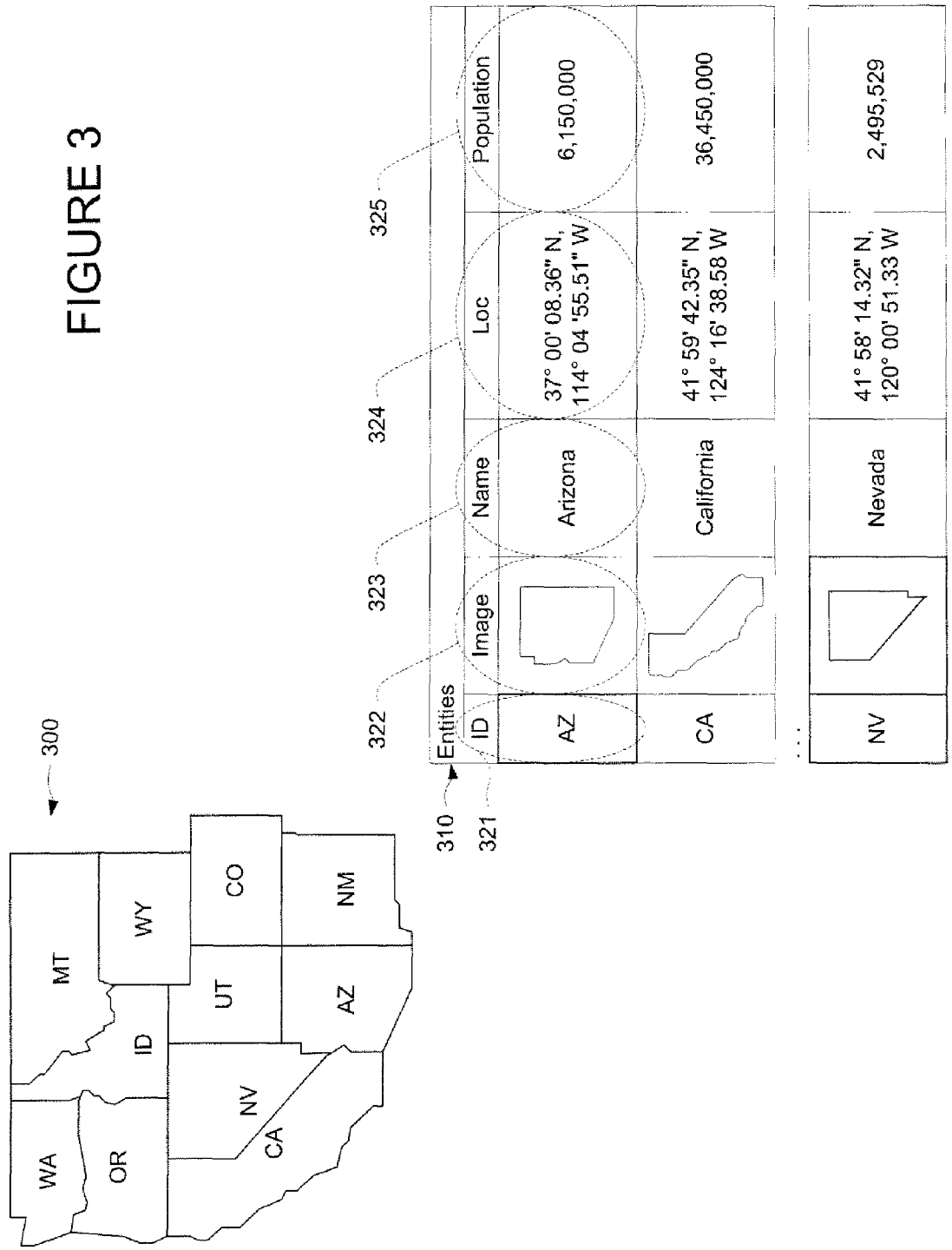
FIG. 3 is a functional diagram of entity data in accordance with an aspect of the system.

The memory may further include entity data 310 identifying entities associated with particular geographic locations, such as geographic regions (e.g., countries, states, provinces, cities, etc.). By way of example and as shown in FIG. 3, entity data 310 may represent a set 300 of states of the United States of America. Each object may be associated with additional information such as a unique identifier 321, an image 322, a name 323, a geographic location 324 and a population 325. (Images associated with actual geographic regions described herein may not be to scale and other information associated therewith may be approximate.)

Geographic entities may include other geographically-located objects in addition to regions, such as points of interest (POI), landmarks, roads, bodies of land or water, items located in a store, items that can be moved to different locations, etc. Therefore, while many of the examples below refer to geographic regions, most aspects of the system and method are not limited to any particular type of geographic entity.

As noted above, the system is also not limited to any particular data structure. As shown in FIG. 3, the data may be stored in a table such as a database table. Yet further, the entity data may be stored as part of an XML file such as "<entity> <id> CA</id> <image> california.gif </image> <name> California</name> <loc>41° 59' 42.35" N, 124° 16' 38.58 W </loc> <population> 36450000 </population> </entity>". Yet further, the entity may be defined by computer code such as JavaScript that is provided as the HTML code of a webpage, such as the following portion of a JavaScript program:

state_names ["CA"]="California";
/* parts define the pixel boundaries of the image when drawn and can test whether a particular image has been clicked by the user */
country_parts ["CA"]=[190, 191, 192, 193];
parts_list [191]=new Array(x1, y1, x2, y2, x3, y3).

In that regard, the system is not limited to any particular data structure.

Figure 4:
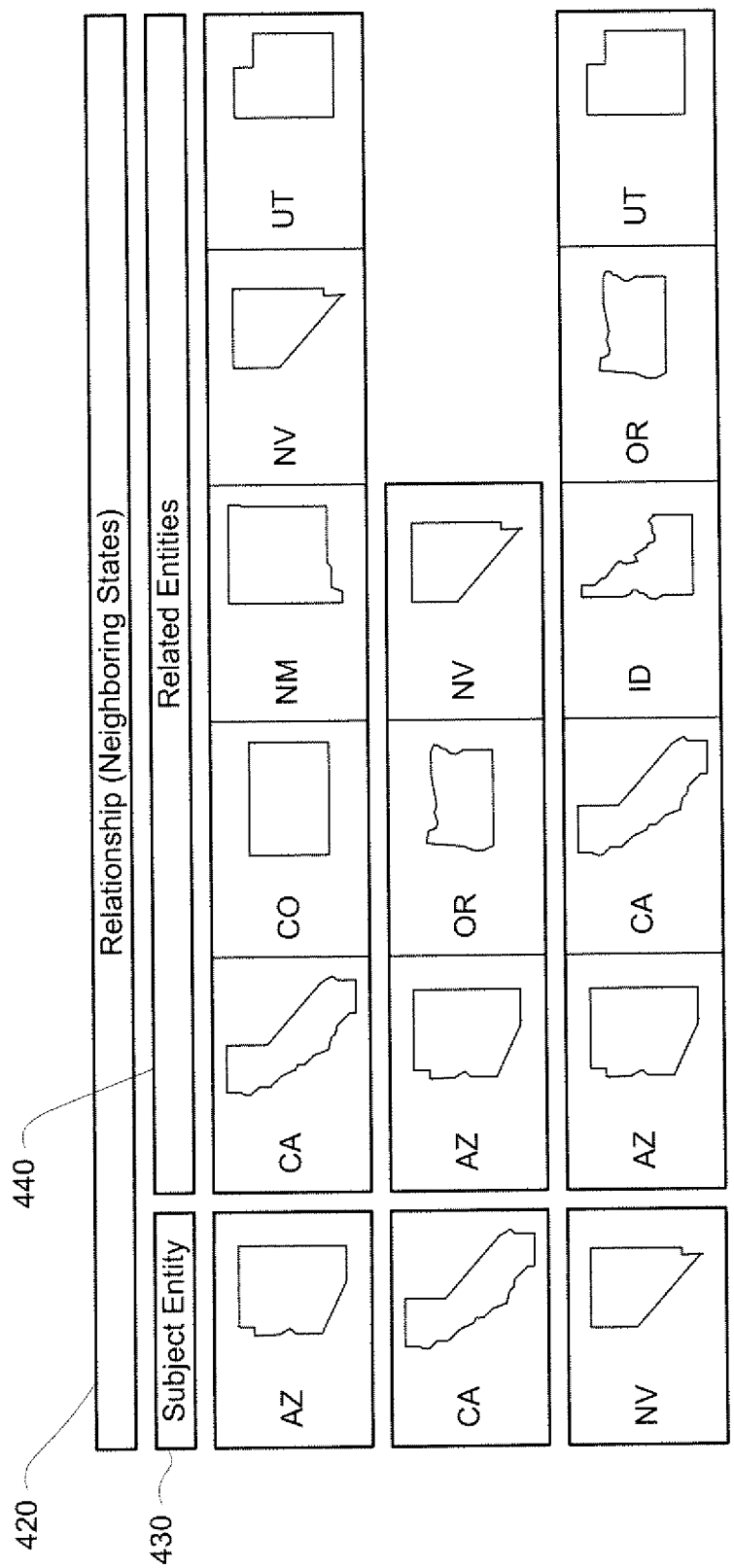
FIG. 4 is a functional diagram of relationship data in accordance with an aspect of the system.

Server 110 may also have access to data 410 that stores relationships between the entities. FIG. 4 functionally illustrates a relationship 420 that identifies the states that border another state. In that regard, the data 420 may identify a subject region 430 (such as California) and the geographic regions that physically touch its borders. Other examples of relationships are described below.

As with the entity data, the system is not limited to any particular data structure for storing relationships. By way of example, the data functionally shown in FIG. 4 may be stored as two tables in a one-to-many relationship in a database, where the relationship is joined at the unique IDs of the entities. The relationship may also be stored as part of an XML file such as "<Relationship> <Name> Neighboring States </Name> <Subject Entity> CA<Related Entity> AZ </Related Entity> <Related Entity> OR </Related Entity> <Related Entity> NV</Related Entity> </Subject Entity> . . . </Relationship>". Continuing the JavaScript example described above, the relationship may also be stored as computer code such as "borders['CA']='AZORNV'".

As explained in more detail below, the data 135 may also identity actions 150 to be taken in connection with the relationships. By way of example only, the action data may include a combination of instructions that are provided to the user (e.g., JavaScript embedded in an HTML page that is sent to the user) and instructions on the server (e.g., the Google Chart API made available by Google, Inc.).

Figure 19:
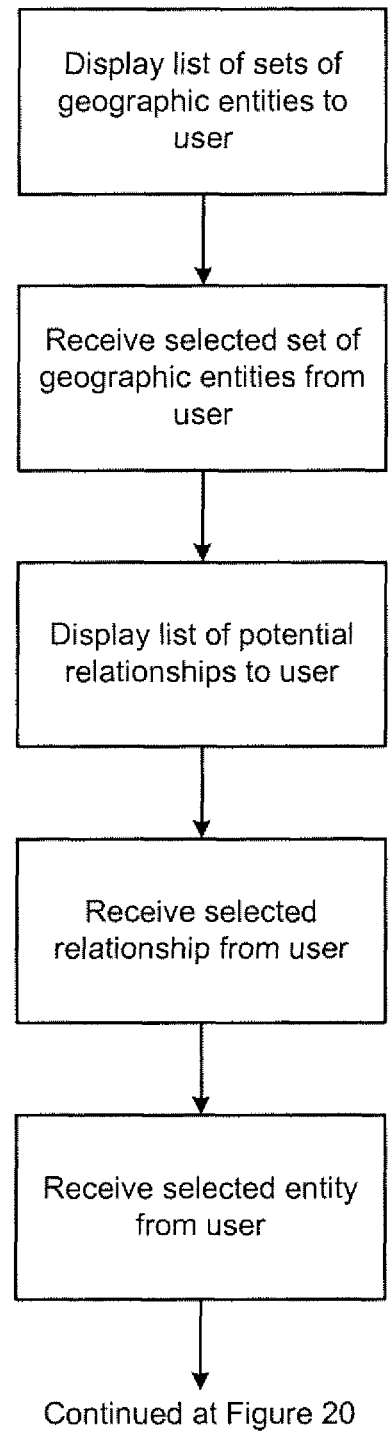
FIG. 19 is a flow chart in accordance with an aspect of the system and method.
Figure 20:
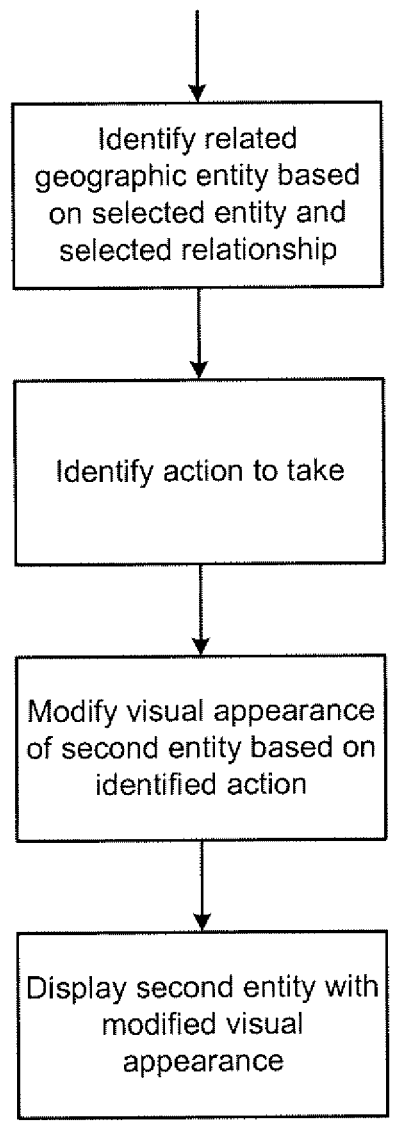
FIG. 20 is a flow chart in accordance with an aspect of the system and method.

In addition to the operations illustrated in FIGS. 19-20, various operations in accordance with a variety of aspects of the invention will now be described. It should be understood that the following operations do not have to be performed in the precise order described below. Rather, various steps can be handled in reverse order or simultaneously.

It will be further understood that the sample values, types and configurations of data shown in the figures are for the purposes of illustration only. In that regard, system and methods in accordance with the present invention may include different data values, types and configurations, and may be provided and received at different times (e.g., via different web pages) and by different entities (e.g., some values may be pre-suggested or provided from different sources).

Figure 5:
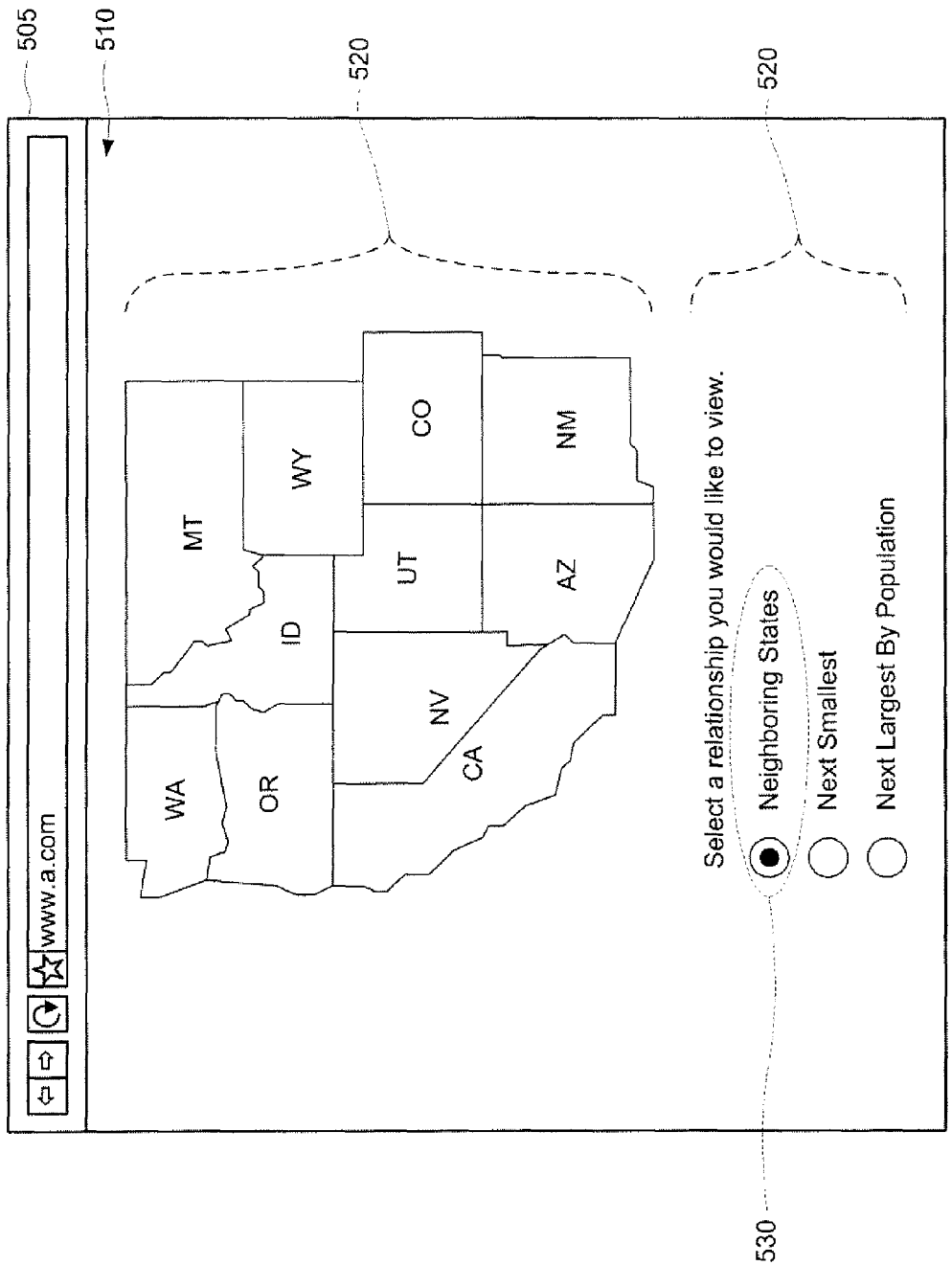
FIG. 5 is a screen shot in accordance with an aspect of the system.

FIG. 5 illustrates information that server 110 may display on client device 170 via network 195. In that regard, the server may provide the client device with a web page 510 to be displayed via a browser 505 where the webpage 510 includes the images of the entities arranged in a map 520.

In one aspect, the device also displays a list of relationships from which the user may select one. By way of example, webpage 510 may display a list 520 of different relationships. FIG. 5 further illustrates the selection of the first option, "Neighboring States", which corresponds with the relationship 420 shown in FIG. 4.

Figure 6:
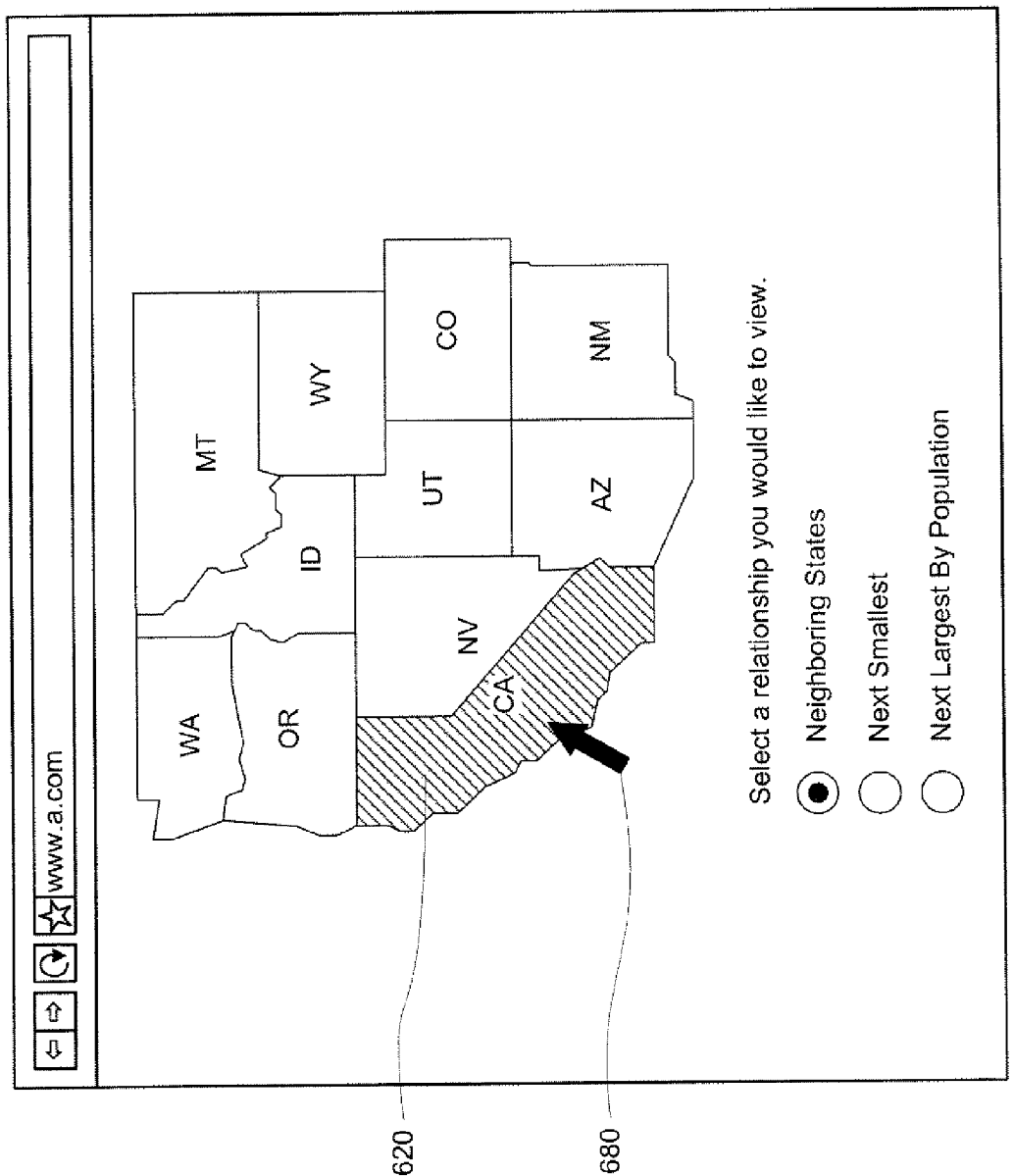
FIG. 6 is a screen shot in accordance with an aspect of the system.

The user may also select an entity in which they are interested. For instance and as shown in FIG. 6, the user may maneuver the mouse cursor 680 to click the entity image 620 of the state of California. In response, the visual appearance of the selected image may change. By way of example, the background pattern of the selected entity may change from a solid color to diagonal lines. Other visual indicia of selection may also be used to highlight the selected entity, such as changing one of the color's of the object, the thickness of lines, or drawing a box or other shape around the object. It will be further understood that the entity may be selected in other ways as well, such as by using the arrow keys of a keyboard to toggle through all entities or using a touch-screen to touch the visual representation of the entity.

The system may determine the entities related to the selected entities based on the relationship information, such as by querying relationship data 410. For example and as shown in FIG. 4, borders relationship data 420 identifies three entities (e.g., Arizona, Oregon and Nevada) as being related to California. If there was no relationship data for California, the system may ignore the request for related entities or inform the user that there are no related entities.

Figure 7:
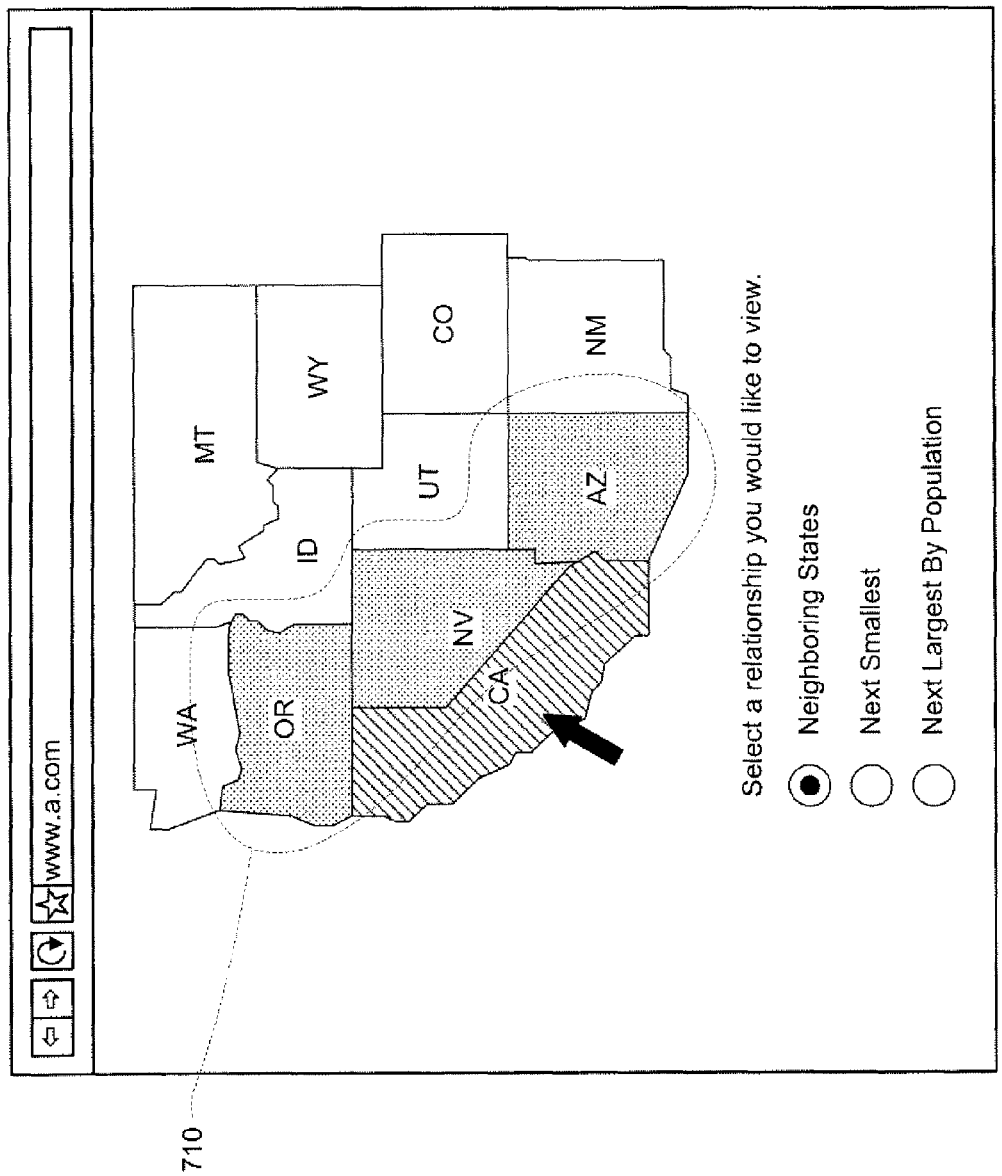
FIG. 7 is a screen shot in accordance with an aspect of the system.

However, if the system determines that there are entities related to the selected entity, the system may change the visual appearance of the related entities. By way of example and as shown in FIG. 7, the processor of the client device may change the appearance of the images 710 of the related entities (e.g., Arizona, Oregon and Nevada), such as from solid white to a stippled background. By way of further example and not limitation, the processor may implement the change by modifying the fill color, fill pattern or line thickness of the entity images if the images are stored in memory as vector based graphics.

Figure 8:
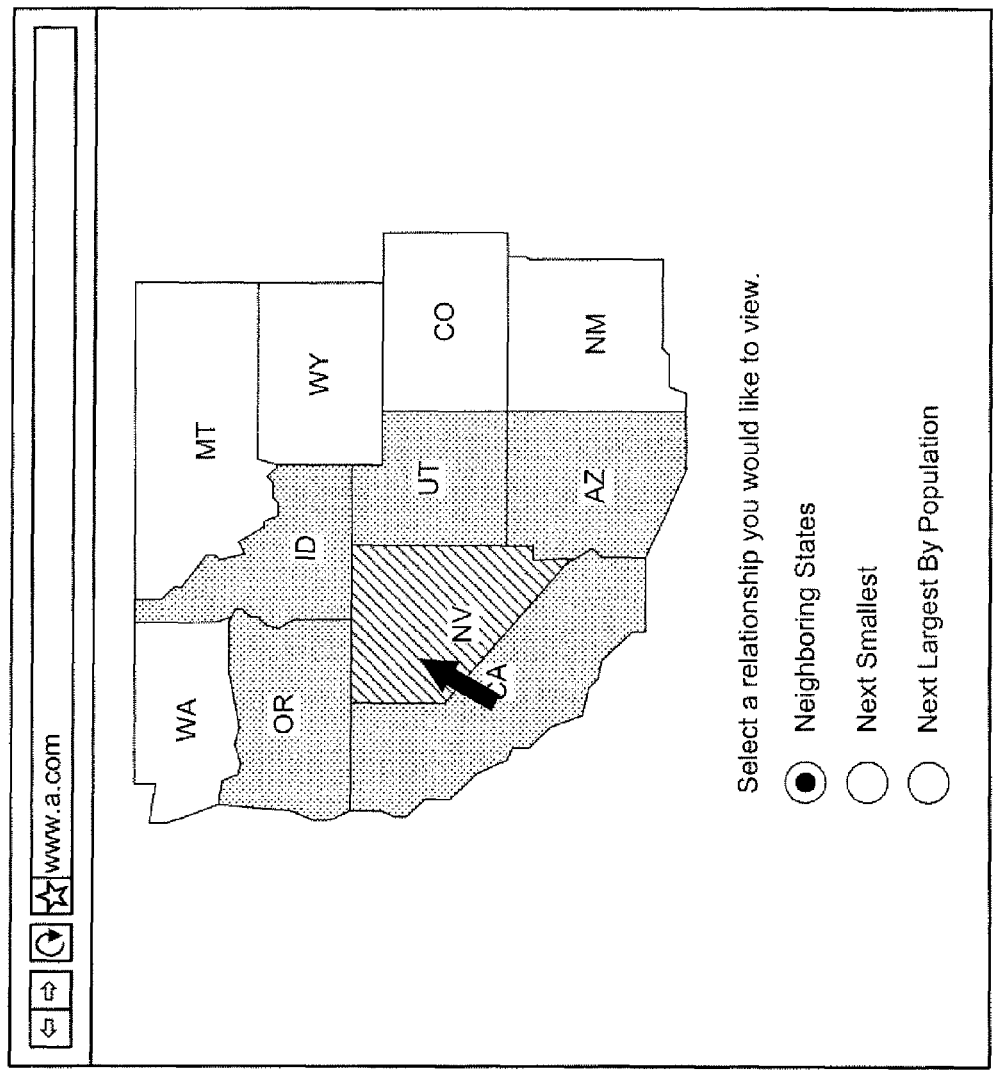
FIG. 8 is a screen shot in accordance with an aspect of the system.

The same process for be repeated for other entities as well. As shown in FIG. 8, if the user selected Nevada (NV), the system may have used border relationship data 420 to determine the states bordering Nevada and change the visual appearance of the bordering states accordingly (e.g., OR, ID, UT, ZA and CA).

Figure 9:
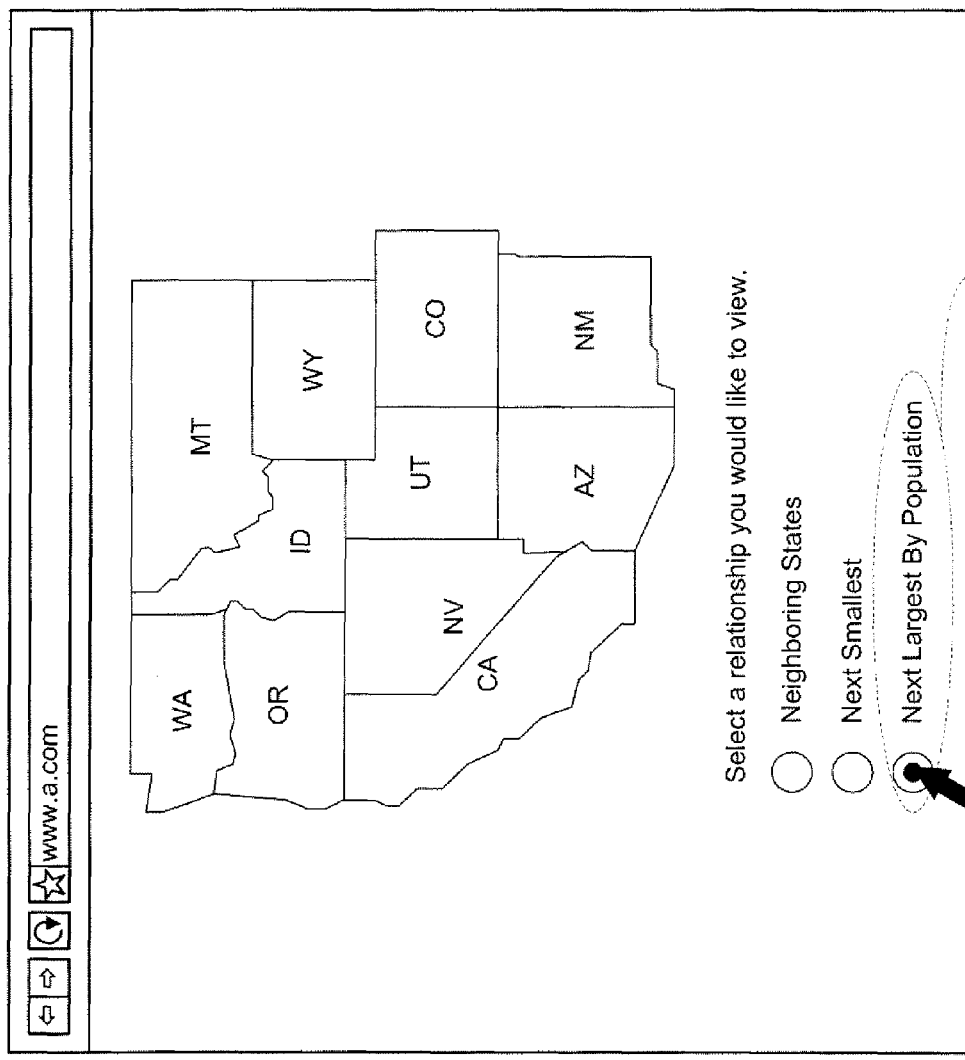
FIG. 9 is a screen shot in accordance with an aspect of the system.
Figure 10:
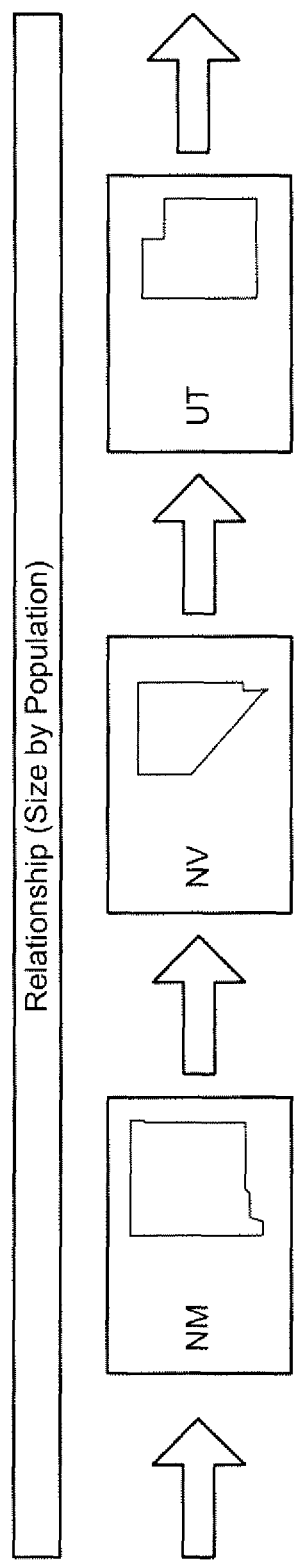
FIG. 10 is a functional diagram of relationship data in accordance with an aspect of the system.

The system may allow a user to view a different relationship for the same set of entities. For example, some relationships may reflect the relative size of a feature of the entity, such as the size of the geographic area it occupies. In that regard and as shown in FIG. 9, the user may use mouse cursor 680 to select relationship 920, which is based on the population of the geographic entities. A portion of sample data illustrating this particular relationship is functionally shown in FIG. 10. The data may be stored as a linked list where each entity is related to one other entity, i.e., one state is related to the next state when the states are ranked in ascending order of population size. Thus, according to the data represented by the figure, Nevada is the next largest state in terms of population after New Mexico, and Utah is the next largest state after New Mexico.

As indicated above, the data may be stored in accordance with a number of different data structures. For example, it may be stored as a lookup table, or as part of an XML file such as "<Relationship> <Name> Next Largest By Population </Name> <Subject Entity> NM <Related Entity> NV </Related Entity> </Subject Entity> . . . </Relationship>". Continuing the JavaScript example described above, the relationship may also be stored as computer code such as "NextLargestPopulation['NM']='NV'". Yet further, if the entity data identifies the precise population values, the system may determine the relationship from the population values such as by sorting the entities by population.

Figure 11:
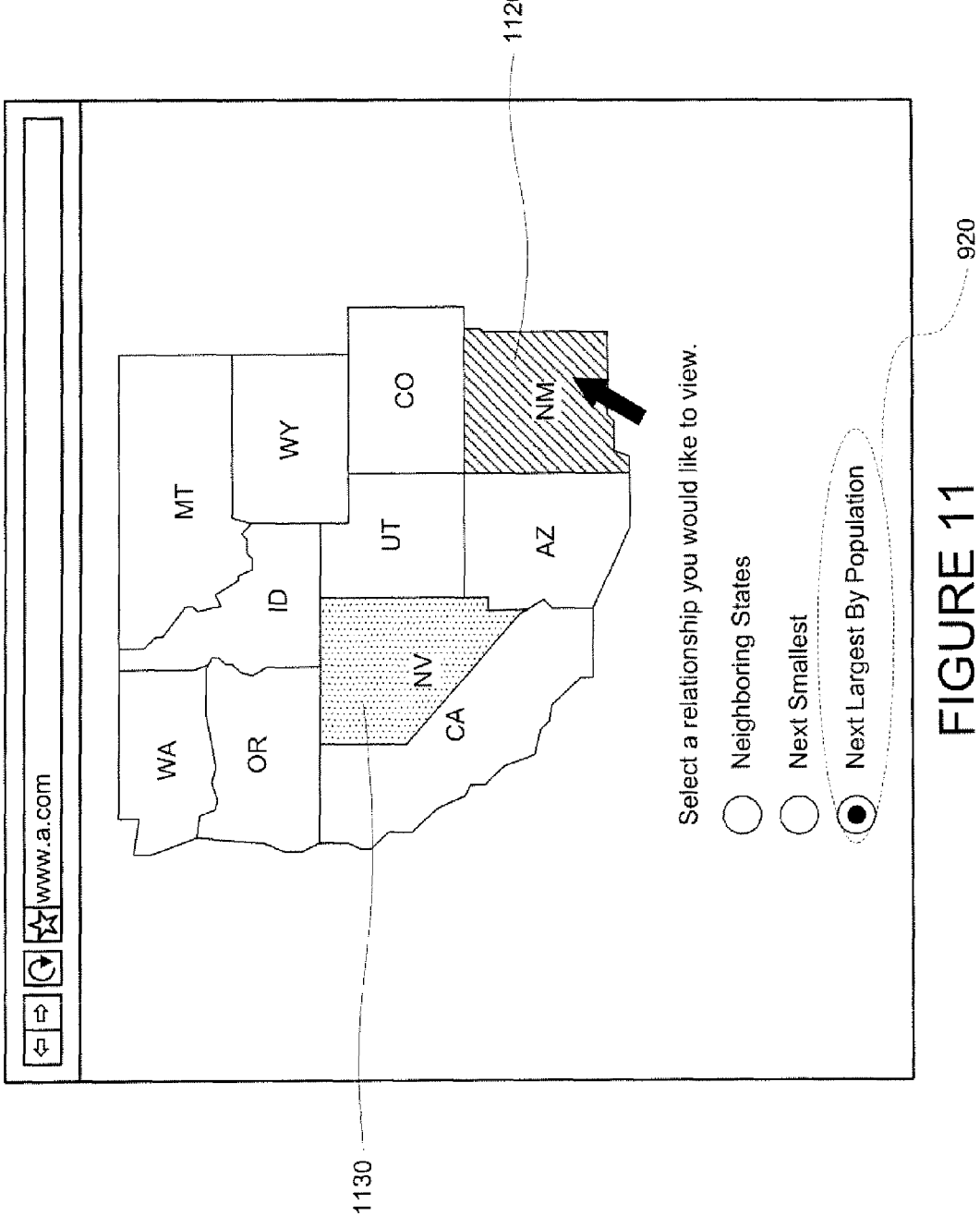
FIG. 11 is a screen shot in accordance with an aspect of the system.
Figure 12:
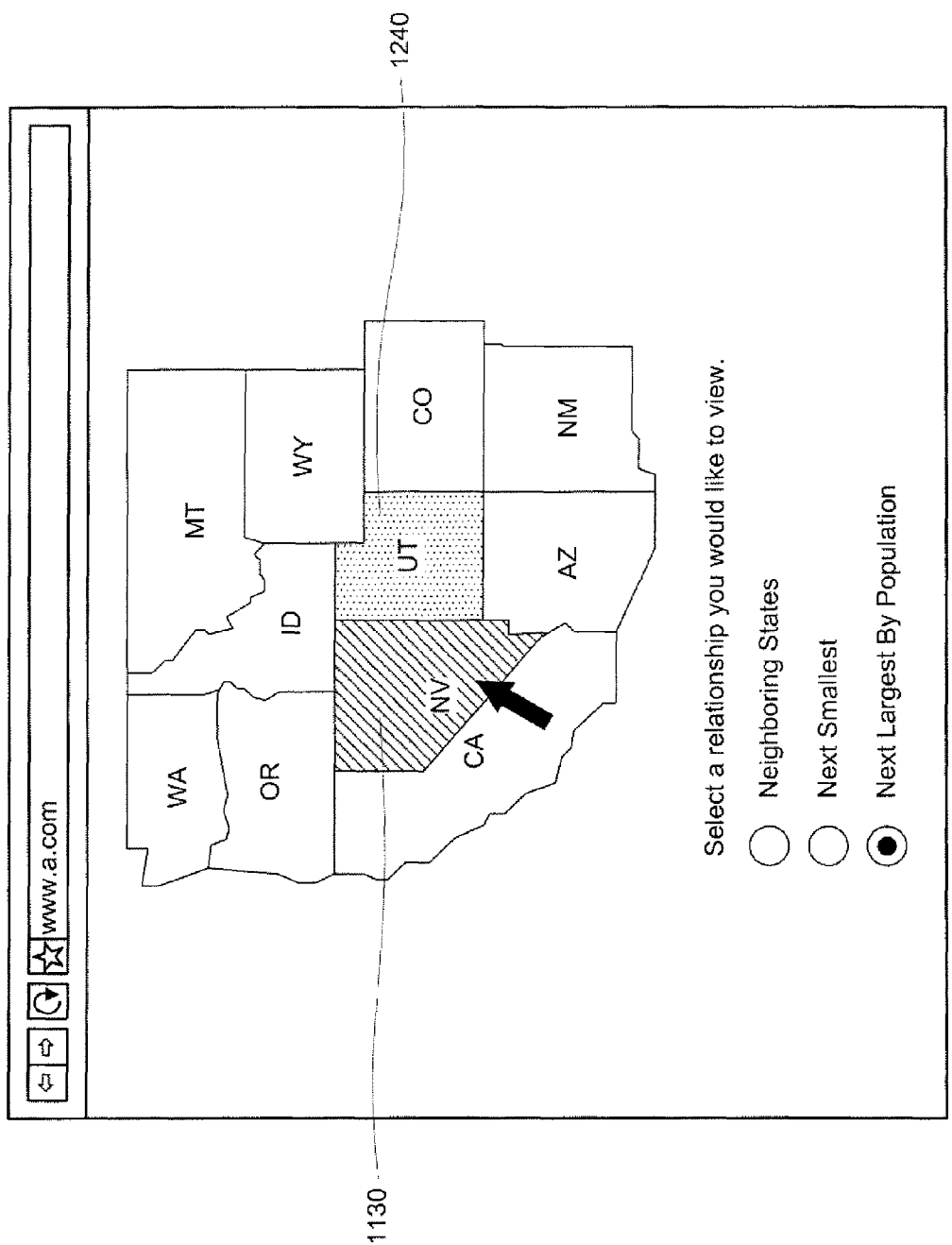
FIG. 12 is a screen shot in accordance with an aspect of the system.

As shown in FIG. 11, when one entity 1120 (e.g., New Mexico) is selected, the visual aspects of another entity 1130 (e.g., Nevada) may change in accordance with the relationship 920. As shown in FIG. 12—where Nevada is selected—the relationship may be one-way. Based on the nature of the relationship, Nevada may be related to New Mexico (because it is the next largest in terms of population) but New Mexico may not be related to Nevada (because the relationship identifies the next-largest entity, not the next smallest). Accordingly, when the image 1130 of the Nevada entity is selected by the user, the system may change the appearance of the image 1240 of Utah.

Accordingly, in one aspect, the system permits the user to select from among multiple relationships, where each relationship links a variety of geographic entities with other geographic entities based on the same linking criteria (e.g., the size of a feature, bordering regions, etc.).

One of the advantages of the invention is its ability to accommodate a wide variety of alternatives and additions to the foregoing features.

Figure 13:
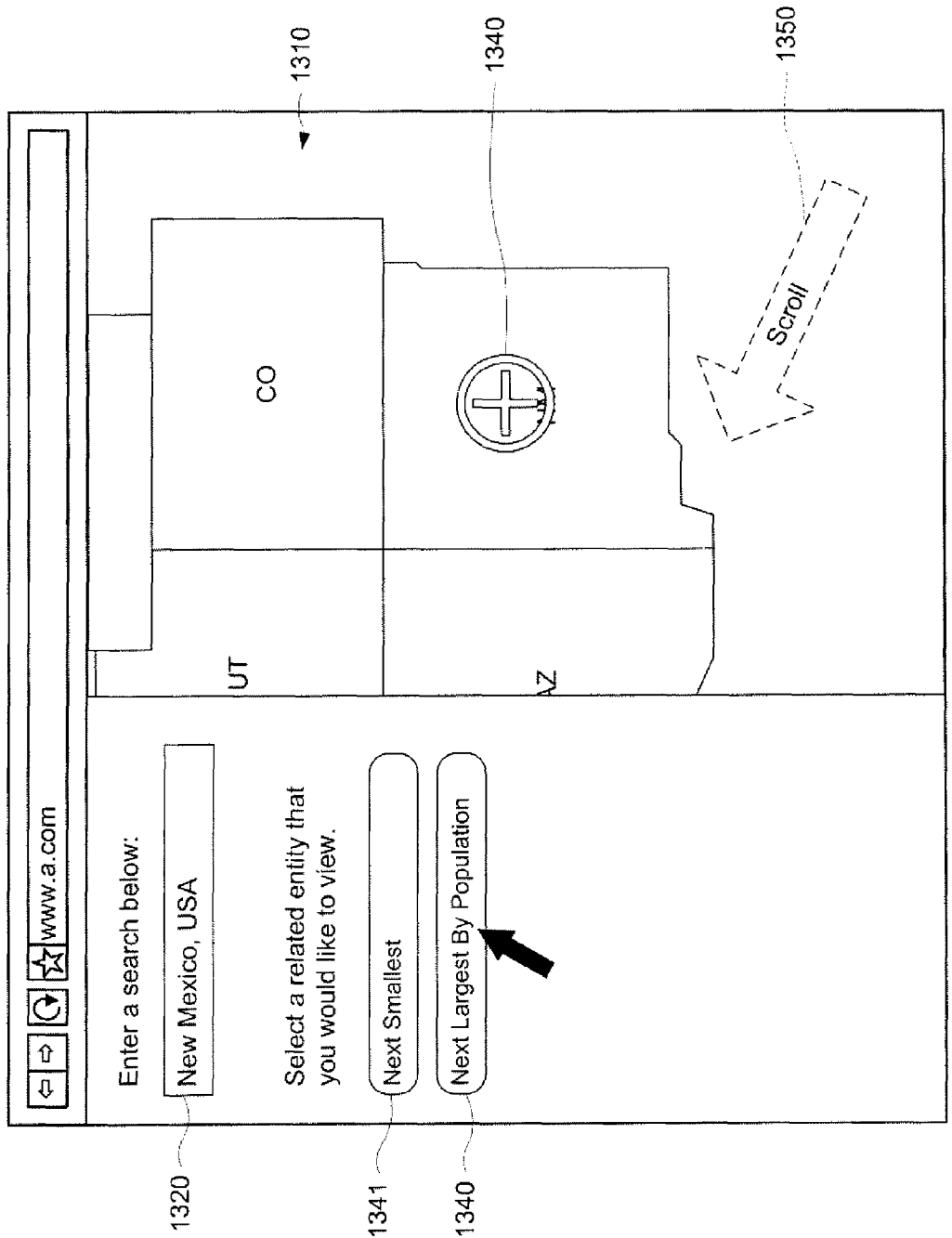
FIG. 13 is a screen shot in accordance with an aspect of the system.

By way of example, the system may permit other actions beyond changing the static visual appearance of an entity image. As shown in FIG. 13, a user may have used a text box 1320 to search for a desired location, with the resulting map 1310 displayed in a panel of a webpage. The map may identify the requested location with a crosshair 1340 or the like. The selectable relationships may be provided in the form of clickable buttons 1340-41.

Figure 14:
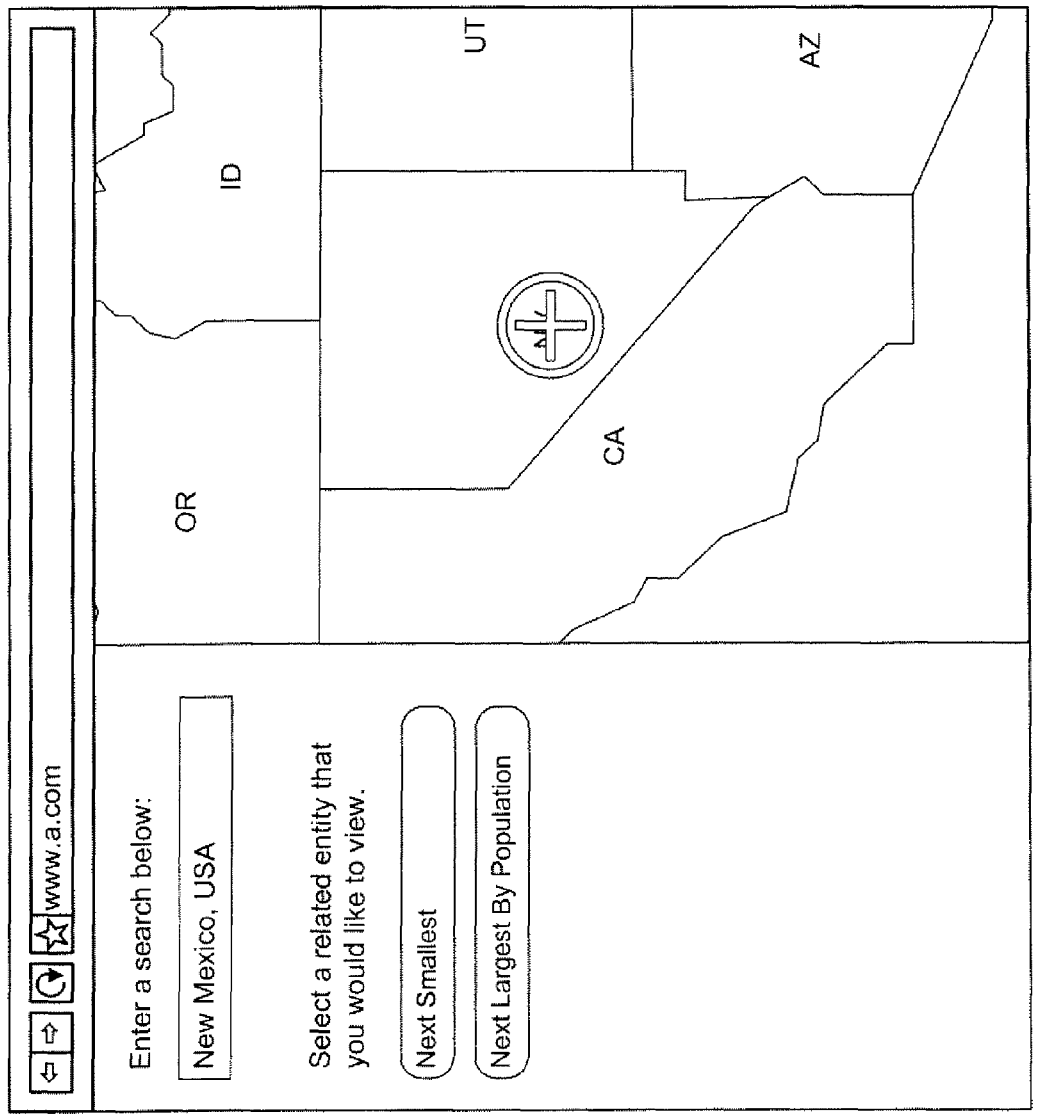
FIG. 14 is a screen shot in accordance with an aspect of the system.

As shown by arrow 1350 in FIG. 13 and the resulting webpage in FIG. 14, the visual appearance of the related entity may be change based on animation. Specifically, the related entity (e.g., Nevada) may scroll into the center of the view but otherwise remain unchanged. The position of the related geographic region may thus change relative to the display screen.

In this aspect, the system also provides an alternative method of traversing a map than panning a map by dragging it with a mouse or using the arrow keys on a keyboard. Rather, clicking on one entity on the map may cause the map to jump or automatically scroll to another entity on the map.

The action may also be conditional. For example, in FIG. 7, the user clicked one entity (CA), which caused three related entities (OR, NV, AZ) to change appearance. As a result, the appearance of the selected entity was changed to reflect the selection pattern (diagonal lines) and the appearance of the related states was changed to reflect the related pattern (stippling). When one of the related states (NV) was selected, its appearance changed to the selection pattern (diagonal lines) and the originally-selected state (CA) was changed to the related pattern (stippling).

Figure 15:
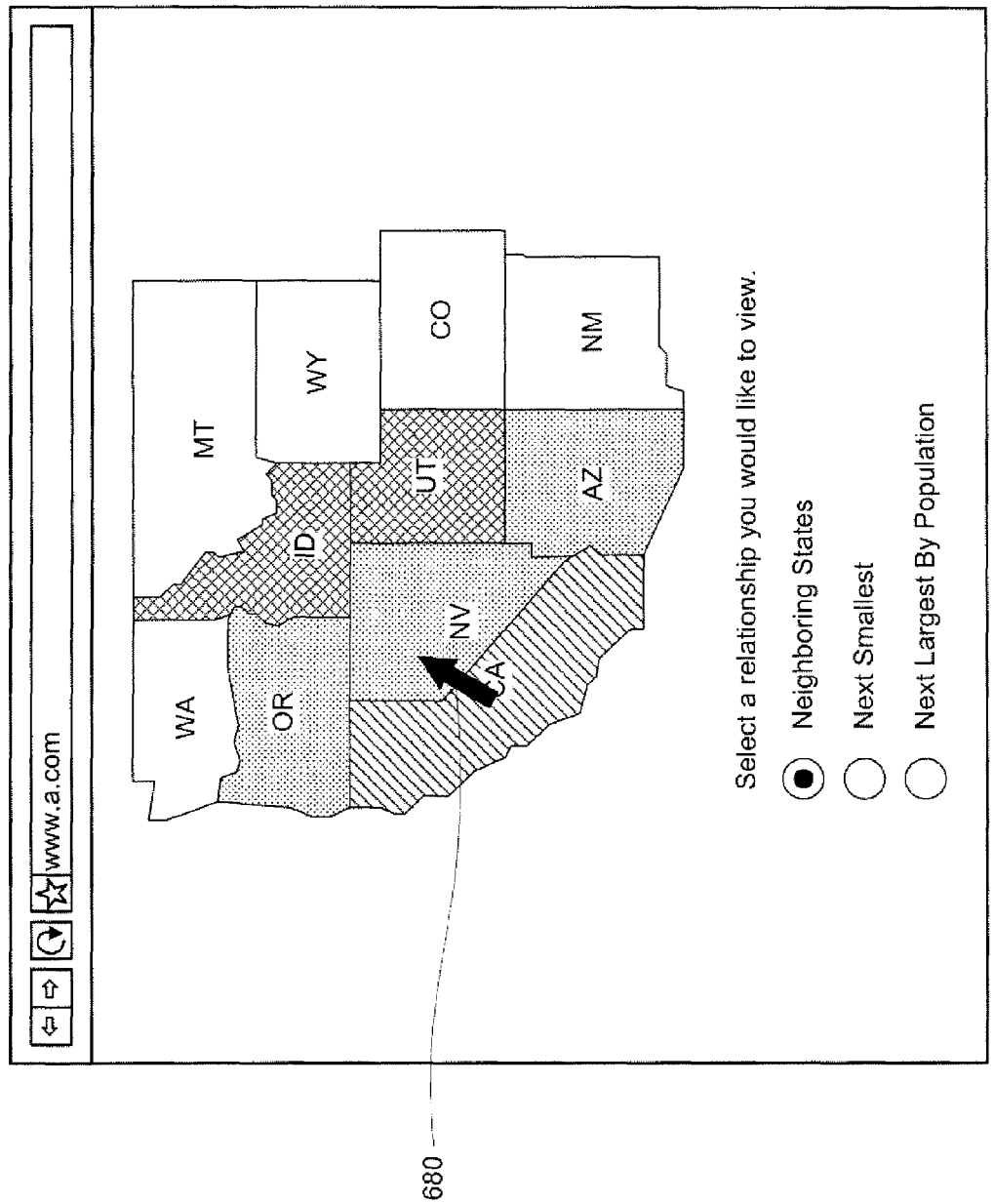
FIG. 15 is a screen shot in accordance with an aspect of the system.

FIG. 15 illustrates an alternative to FIG. 8; the appearance of the entity depends on other information beyond its relationship to the selected entity. When the user uses mouse cursor 680 to select an entity, the action may indicate that the visual appearance of the entity should not change if it is different than a default appearance. In that regard, when Nevada (NV) is selected, neither its appearance (stippling) nor previously-selected California's appearance (diagonal lines) may change. The action may also indicate that when the visual appearance of an entity should change from the default, then its new appearance should be different from any other entity that is already indicating it was selected or related (e.g., cross-hatch). In that regard, the action may define an appearance for a related entity that depends on both the relationship and other information.

The system may also accommodate a wide variety of relationships in addition to those described above. By way of example and not by limitation, other relationships may include roads (e.g., linking San Francisco to Los Angeles because they are connected by a highway) and the order of events occurring at one geographic entity relative to another geographic entity (e.g., Beijing may be linked to Athens because the Olympics were held in Beijing after Athens).

Figure 16:
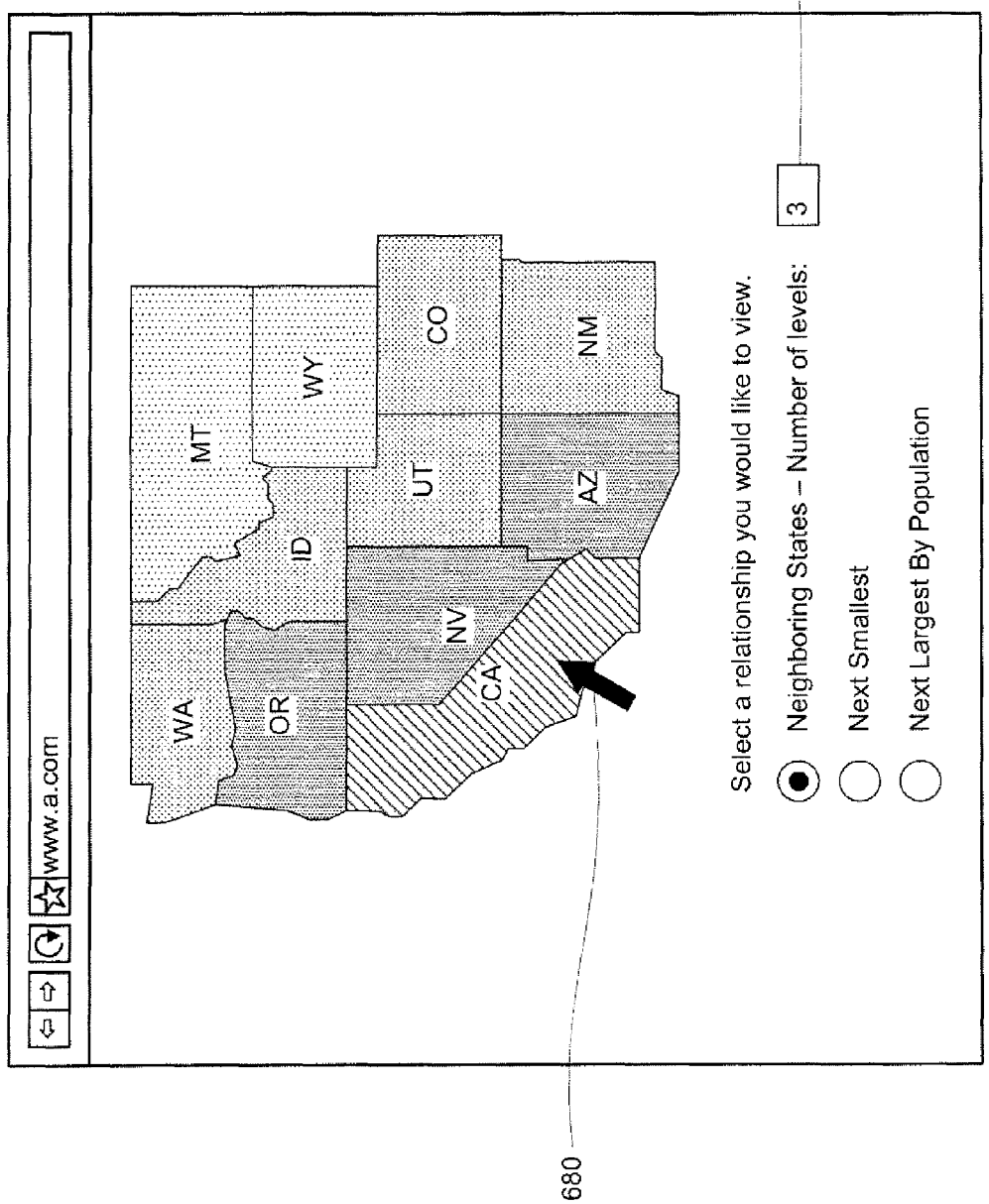
FIG. 16 is a screen shot in accordance with an aspect of the system.

The system may also change the appearance of the entity based on indirect relationships. For example and as shown in FIG. 16, the webpage may provide the user with the option 1620 of indicating how many levels of indirect relationships will be shown when an entity is selected. In that regard, when one entity (e.g., CA) is selected, all of the entities to which it is directly related may change appearance (e.g., OR, NV and AZ are densely stippled). The system may then recursively determine whether any of the related entities have their own related entities and change the appearance of these as well (e.g., WA, ID, UT, CO and NM receive stippling of medium density). This may continue (e.g., the backgrounds of MT and WY are lightly stippled) until a user-defined limit (e.g., the number set forth in textbox 1620) or other defined limit (e.g., the appearance of all entities have changed) is reached.

Accordingly, in one aspect, appearances of the individual entities illustrate at a glance how closely one entity is related to the selected entity (e.g., the density of the stippling of FIG. 16 is proportional to the distance of one entity to another in view of the relationship). In that regard, a user could answer questions such as "what are the fewest number of states I would need to cross to walk from California to Montana?", "which land-connected countries are farthest removed from each other?", or "out of all possible pairs of countries in Africa, how many pairs share a border?").

Figure 17:
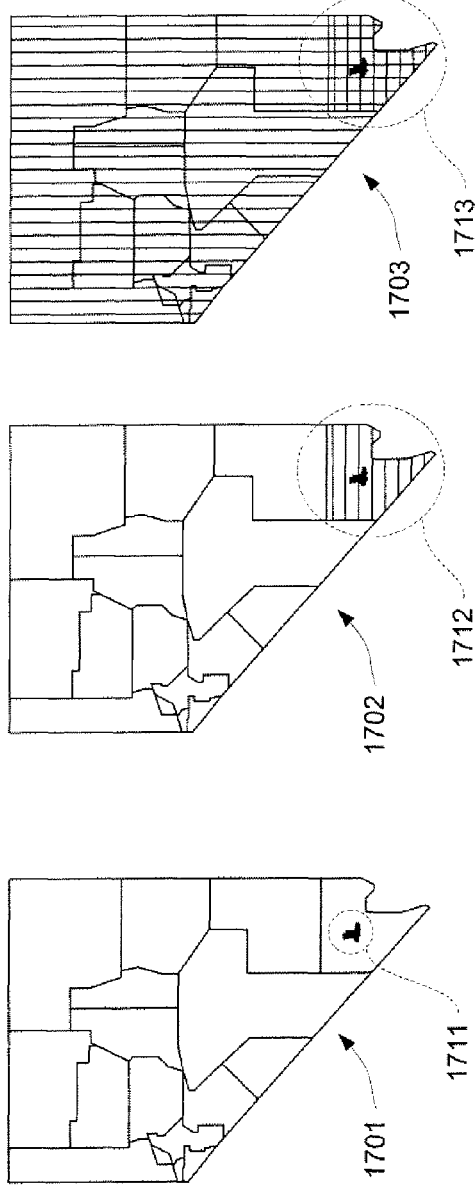
FIG. 17 is a functional diagram of entity data and relationship data, and the display of images associated with entities, in accordance with an aspect of the system.

In addition to the entity data representing states shown in FIG. 3, FIG. 17 illustrates entity data 1750 and relationship data 1760 that defines an entity's membership within a larger entity. For example, one geographic entity may be contained in but not occupy the entire area of another region such as a county 1751-52 within a larger state, or a city 1753 contained within a county 1751. The relationship data 1760 may also define whether one entity (e.g., the "parent") may be considered to contain another entity (e.g., the "child").

In that regard, as shown on map 1701, a user may select a particular city 1711 and request to see the region in which it is contained. By querying relationship data 1760, the system may change the appearance of the city's county 1712 as shown on map 1702. The user may issue a similar request for the parent of newly-highlighted county 1712, in which case the system may query the relationship data 1760, and retrieve and display the county's state as shown in map 1703. As also shown in FIG. 17, the appearance of the county 1713 may reflect its relationship as both a parent (horizontal lines) and child (vertical lines) of another geographic entity.

In that regard, some aspects of the system allow users to dynamically interact with the individual regions of a map beyond panning, zooming and memorizing. This may be particularly appealing and helpful to children.

Figure 18:
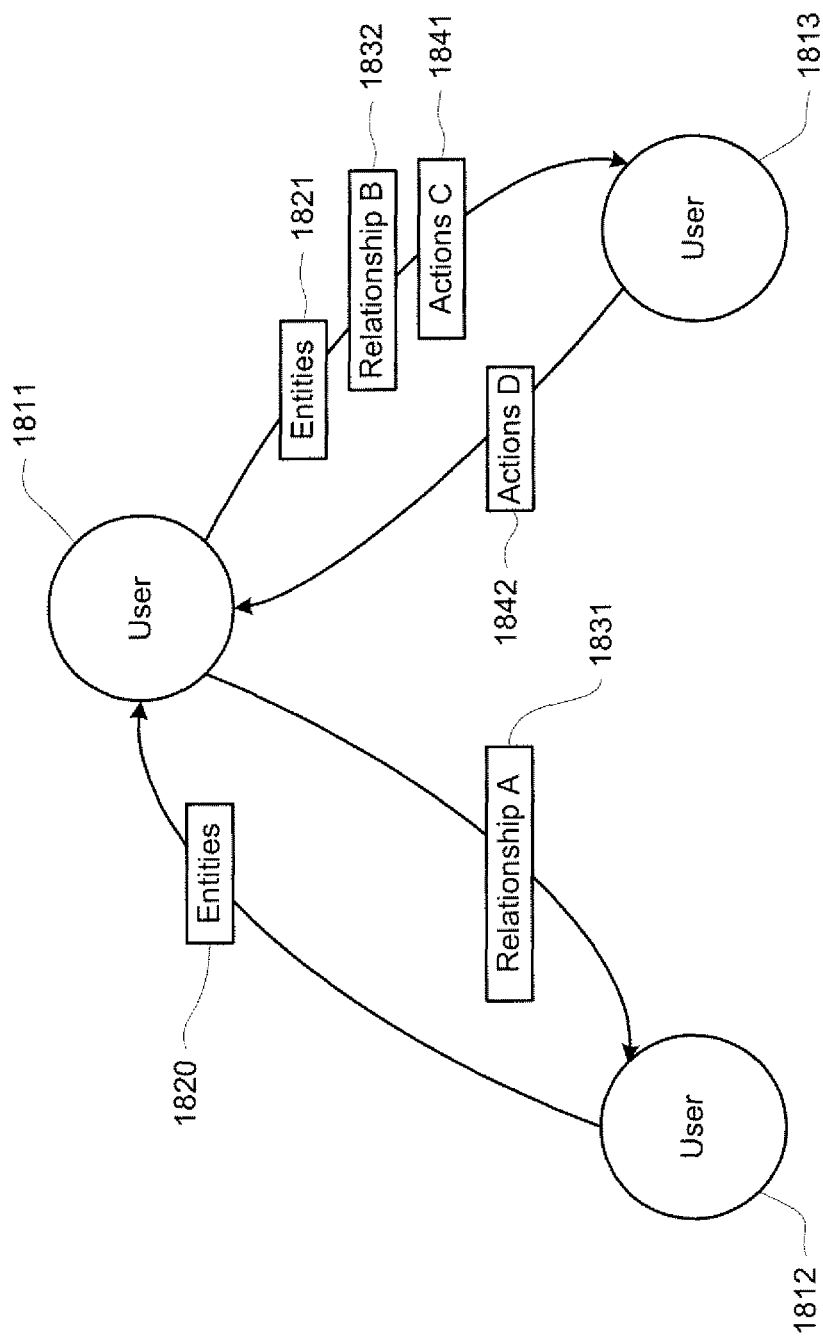
FIG. 18 is a functional diagram of users exchanging entity data, relationship data and action data in accordance with an aspect of the system.

In yet another aspect, the system permits users to exchange entity data, relationship data and action data. As shown in FIG. 18, user 1812 may provide a set of entities 1820 (e.g., states) to user 1811. For instance, the entity data 1820 may comprise an XML file of entities that was emailed from user 1812 to user 1811 from one node of the network to another.

User 1811, in turn, may create and transmit relationship data 1831 (e.g., neighboring states) for the same entities to user 1812. User 1811 may also modify and transmit the entities 1820 as a new set of entities 1821, or simply transmit the entities unmodified, to user 1813. User 1811 may also transmit a different relationship 1832 (e.g., next largest state) and data defining actions (e.g., an XML file defining colors to use or a computer code module) to a third user 1813. The user 1813, in turn, may return a different set of actions 1842 (e.g., an XML file identifying animation instead of colors) to user 1811 based on the same entities 1821 and relationship 1832 received from user 1811.

In yet another aspect, the information may be exchanged in connection with a service maintained by server 110. For example, users 1811-13 may each have accounts with the operator of server 110 and access these accounts using a browser from client devices 170-72 via different nodes of the network. The users may also grant one another permission to use the various entities, relationships and actions they have created (e.g., as a layer to the services offered via Google Maps or Google Earth). Some or all of this information may rely on API made available by the server, such as Google Chart API.

In that regard, some aspects of the system provide users with the ability to collaborate on new sets of entities, relationships and actions individually and collectively. By allowing the users to mix, match and customize various configurations of the three elements, the system permits a nearly endless variety of permutations.

In other aspects, functions described above as being performed by the server may be performed by the client device, and vice versa. For example, many of the foregoing functions may be performed by a client device that stores the entity, relationship and action data in its internal memory along with instructions for processing the data. On the other hand, a server may perform many of the processing functions and simply provide the user with a webpage containing hyperlinks, e.g., the client device may receive a map with hyperlinked names of countries, and clicking on a hyperlinked country causes the server to calculate the related country and send a new webpage that highlights the related country.

In yet more aspects, the client device and server perform and share different functions. For example, the server may provide data identifying the desired action by sending information that identifies one characteristic to be displayed differently (e.g., sending a background color to use when an entity is identified as being related) or an entire new image of the related entity (e.g., sending an entire new webpage containing a highlighted version of the related entity). Yet further, the server may provide all of the entity data, relationship data and action data as JavaScript in an HTML webpage delivered to the client device.

As these and other variations and combinations of the features discussed above can be utilized without departing from the invention as defined by the claims, the foregoing description of the embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

The invention claimed is:
1. A method comprising:
displaying, on an electronic display of a client device, a plurality of geographic regions on a map, each geographic region being displayed with a visual characteristic;
receiving, with the client device, data specifying a plurality of predefined relationships, wherein:
at least one predefined relationship associates at least one geographic region with at least one other geographic region and the at least one predefined relationship identifies whether a road connects one geographic region with another geographic region; and
the data specifying the plurality of predefined relationships comprises relationship data having been modified by one of a plurality of client devices in communication with the client device;
receiving a user's selection of a graphical representation of a first geographic region from the plurality, the graphical representation being part of the map;
receiving a user's further selection of a predefined relationship associated with the first geographic region;
determining, with a processor and based on the identification of the first geographic region and a predefined relationship associated with the first region, a second geographic region based on the received data;

modifying the visual characteristic associated with the second geographic region from the plurality that is associated with the first geographic region by the user's further selection of the first predefined relationship; and in response to the user's selection of the graphical representation of the first geographic entity and the user's further selection of the predefined relationship, displaying the second geographic region with the modified visual characteristic, wherein:

at least one geographic region of the plurality of geographic regions includes other geographic regions as members and at least one of the predefined relationships is based on whether one geographic region is a member of another geographic region;

the second geographic region is contained in but not occupying the entire area of the first geographic region;

a third geographic region of the plurality of geographic regions is contained in but not occupying the entire area of the second geographic region; and at least one predefined relationship of the plurality of predefined relationships is based on whether one geographic region is contained in but does not occupy the entire area of another region.

2. The method of claim 1 wherein modifying the visual characteristic associated with the second geographic region comprises changing the color of the second geographic region.

3. The method of claim 1 wherein at least one of the predefined relationships identifies whether the geographic regions border one another.

4. The method of claim 1 wherein the feature of the geographic region is the size of the geographic area occupied by the geographic region.

5. The method of claim 1 wherein at least one of the predefined relationships is based on the timing of events occurring at the geographic region.

6. The method of claim 1 further comprising:

modifying the visual characteristic associated with the third geographic region, and displaying the third geographic region with the modified visual characteristic.

7. The method of claim 6 wherein modifying the visual characteristic comprises changing a color of the second geographic region to a color different than a color of the first region, and changing a color of the third geographic region to a color different than a color of both the first and second region.

8. The method of claim 1 wherein modifying the visual characteristic comprises changing the position of the second geographic region relative to the electronic display.

9. The method of claim 8 wherein changing the position of the second geographic region relative to the electronic display comprises scrolling a map of the geographic regions such that the second geographic region becomes visible on the display.

10. A system comprising:

a first computer at a first node of a network;

the first computer having access to instructions operable by the first computer, a set of geographic regions, image information associated with each geographic region, and a plurality of predefined relationships wherein each predefined relationship links one region to another region based on the same linking criteria; and a first client device at a second node of the network different from the first node, the first client device comprising a user input device, an electronic display, a processor and instructions operable by the processor;

the instructions of the first computer comprising:

receiving an identification of a predefined relationship from the first client device, wherein at least one predefined relationship identifies whether a road connects one geographic region with another geographic region;

transmitting image information associated with a plurality of a geographic regions to the first client device;

receiving an identification of a first geographic region from the first client device;

determining a second geographic region based on the first geographic region and the identified predefined relationship; and transmitting different image information associated with the second geographic region to the first client device over the network; and the instructions of the first client device comprising:

displaying, based on the transmitted image information, a map depicting the plurality of geographic regions;

receiving user input identifying a selection of a graphical representation of the first geographic region in the map;

transmitting to the first computer an indication of the first geographic region;

displaying the second geographic region prior to identifying the first geographic region; and displaying the second geographic region in accordance with the different image information in response to the identification of the first geographic region and the identified predefined relationship; and wherein:

the first client device communicates with a second client device at a third node of the network to provide at least one of the plurality of predefined relationships to the second client device, the at least one of the plurality of predefined relationships having been modified by the first client device;

at least one geographic region of the plurality of geographic regions includes other geographic regions as members and at least one of the predefined relationships is based on whether one geographic region is a member of another geographic region;

the second geographic region is contained in but not occupying the entire area of the first geographic region;

a third geographic region of the plurality of geographic regions is contained in but not occupying the entire area of the second geographic region; and at least one predefined relationship of the plurality of predefined relationships is based on whether one geographic region is contained in but does not occupy the entire area of another region.

11. The system of claim 10 wherein the network is the Internet.

12. The system of claim 10 wherein the first computer is a web server.

13. The system of claim 10 wherein the client device is a personal computer.

14. The system of claim 10 wherein the different image information comprises the changed value of a characteristic of the image of the second geographic region.

15. The system of claim 10 wherein the different image information comprises a new image of the second geographic region.

16. The system of claim 15 wherein the new image is provided in connection with the transmission of a new web page.

17. A system comprising:
a first client device at a first node of a network;
a second client device at a second node of the network;
a third client device at a third node of the network;
a server configured to provide region data to each one of the first client device, second client device, and third client device;
wherein each client device is associated with a display, a processor executing instructions, and has access to the region data, relationship data and action data,
wherein region data comprises data identifying a plurality of geographic regions and an image associated with the geographic region;
wherein relationship data comprises data identifying predefined relationships between the geographic regions, at least one predefined relationship identifies whether a road connects one geographic region with another geographic region;
wherein action data comprises data identifying how, in response to a selection of a first region and a predefined relationship, a second region should be displayed when the second region is identified based on the selected, predefined relationship with the first region;
wherein:
    the instructions of each client device comprise modifying one or more predefined relationships and providing the one or more modified, predefined relationships to one of the other client devices over the network;
    at least one geographic region of the plurality of geographic regions includes other geographic regions as members and at least one of the predefined relationships is based on whether one geographic region is a member of another geographic region;
    the second geographic region is contained in but not occupying the entire area of the first geographic region;
    a third geographic region of the plurality of geographic regions is contained in but not occupying the entire area of the second geographic region; and
    at least one predefined relationship of the plurality of predefined relationships is based on whether one geographic region is contained in but does not occupy the entire area of another region.

18. The system of claim 17 wherein the instructions of each client device further comprises modifying and providing region data to one of the other client device over the network.

19. The system of claim 18 wherein the instructions of each client device further comprises modifying and providing action data to one of the other client device over the network.

20. The system of claim 17 wherein the instructions of providing the one or more modified, predefined relationships to one of the other client devices comprises instructions for emailing the region data in a file.

21. The system of claim 17 wherein the instructions of providing the one or more modified, predefined relationships to one of the other client devices comprises a browser for accessing a web server, uploading the region data to the web server, and providing another one of the client devices with access to the region data.

22. A system comprising:
a processor device;
instructions operable by the processor;
an electronic memory storing the instructions; and
an electronic memory storing data accessed by the processor;
the instructions comprising:
    displaying, on an electronic display of a first client device, a plurality of geographic regions on a map, each geographic region being displayed with a visual characteristic;
    accessing data identifying a plurality of predefined relationships, where at least one predefined relationship either associates at least one geographic region with at least one other geographic region based on a first value of a first feature of the at least one geographic region relative to a second value of a second feature of the at least one other geographic region, and the at least one predefined relationship identifies whether a road connects one geographic region with another geographic region;
    receiving a user's selection of a graphic representation of a first geographic region, the graphical representation being part of the map;
    receiving a user's further selection of a predefined relationship associated with the first geographic region;
    determining, with the processor and based on the identification of the first geographic region and one of the plurality of predefined relationships, a second geographic region;
    modifying the visual characteristic associated with the second geographic region;
    in response to the user's selection of the graphical representation of the first geographic region and the user's further selection of the predefined relationship, displaying the second geographic region with the modified visual characteristic;
    modifying, with the first client device, at least one predefined relationship of the plurality of predefined relationships; and
    providing the modified at least one predefined relationship of the plurality of predefined relationships to a second client device, wherein:
        at least one geographic region of the plurality of geographic regions includes other geographic regions as members and at least one of the predefined relationships is based on whether one geographic region is a member of another geographic region;
        the second geographic region is contained in but not occupying the entire area of the first geographic region;
        a third geographic region of the plurality of geographic regions is contained in but not occupying the entire area of the second geographic region; and
        at least one predefined relationship of the plurality of predefined relationships is based on whether one geographic region is contained in but does not occupy the entire area of another region.

23. The method of claim 22 wherein modifying the visual characteristic associated with the second geographic region comprises changing the color of the second geographic region.

24. The method of claim 22 wherein at least one of the relationships identifies whether the geographic regions border one another.

25. A non-transitory computer-usable medium including a program executable by a processor comprising:

computer code that displays, on an electronic display of a first client device, a plurality of geographic regions on a map, each geographic region being displayed with a visual characteristic;

computer code that accesses data identifying a plurality of predefined relationships, where at least one predefined relationship associates at least one geographic region with at least one other geographic region based on a first value of a first feature of the at least one geographic region relative to a second value of a second feature of the at least one other geographic region, and the at least one predefined relationship identifies whether a road connects one geographic region with another geographic region;

computer code that receives a user's selection of a graphic representation of a first geographic region, the graphical representation being part of the map;

computer code that receives a user's selection of the at least one predefined relationship;

computer code that modifies the visual characteristic associated with the second geographic region, computer code that displays the second geographic region with the modified visual characteristic in response to the user's selection of the graphic representation of the first geographic region and the at least one predefined relationship;

computer code that modifies at least one predefined relationship of the plurality of predefined relationships; and computer code that provides the modified at least one predefined relationship to a second client device, wherein:

at least one geographic region of the plurality of geographic regions includes other geographic regions as members and at least one of the predefined relationships is based on whether one geographic region is a member of another geographic region;

the second geographic region is contained in but not occupying the entire area of the first geographic region;

a third geographic region of the plurality of geographic regions is contained in but not occupying the entire area of the second geographic region; and at least one predefined relationship of the plurality of predefined relationships is based on whether one geographic region is contained in but does not occupy the entire area of another region.

\* \* \* \* \*